United States Patent
Lee et al.

(10) Patent No.: US 12,535,867 B2
(45) Date of Patent: Jan. 27, 2026

(54) ELECTRONIC DEVICE AND METHOD FOR CONTROLLING HEAT GENERATION THEREOF DURING A CALL

(71) Applicant: Samsung Electronics Co., Ltd., Suwon-si (KR)

(72) Inventors: Sanghyun Lee, Suwon-si (KR); Jungmin Oh, Suwon-si (KR); Yoseob Kwak, Suwon-si (KR); Joohong Kim, Suwon-si (KR); Sungho Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 175 days.

(21) Appl. No.: 18/347,231

(22) Filed: Jul. 5, 2023

(65) Prior Publication Data

US 2024/0103592 A1    Mar. 28, 2024

Related U.S. Application Data

(63) Continuation of application No. PCT/KR2023/007618, filed on Jun. 2, 2023.

(30) Foreign Application Priority Data

Sep. 22, 2022  (KR) .................. 10-2022-0119877
Sep. 30, 2022  (KR) .................. 10-2022-0125225

(51) Int. Cl.
*G06F 1/20*  (2006.01)
*H04W 52/18*  (2009.01)

(52) U.S. Cl.
CPC ............ *G06F 1/206* (2013.01); *H04W 52/18* (2013.01)

(58) Field of Classification Search
CPC ............ G06F 1/20; G06F 1/206; G06F 11/30
(Continued)

(56) References Cited

U.S. PATENT DOCUMENTS 7,206,567 B2 *  4/2007  Jin ..................... H04M 1/677
                                                    455/67.11
7,239,886 B2     7/2007  Gross et al.
(Continued)

FOREIGN PATENT DOCUMENTS

CN    105578416 A    5/2016
KR    10-0678213 B1   2/2007
(Continued)

OTHER PUBLICATIONS

International Search Report dated Sep. 6, 2023, issued in International Patent Application No. PCT / KR2023/007618.

*Primary Examiner* — Titus Wong
(74) *Attorney, Agent, or Firm* — Jefferson IP Law, LLP (57) ABSTRACT

An electronic device is provided. The electronic device includes a temperature sensor, a communication circuit, a memory, and a processor. The processor identifies whether the temperature measured through the temperature sensor satisfies a specified condition, in a state of performing data transmission or reception through a call channel between an external electronic device and the electronic device, adjusts the bit rate of a codec that encodes data to be transmitted through the call channel when the measured temperature satisfies the specified condition, and blocks data transmission and/or reception through a radio bearer mapped to a packet data network (PDN) corresponding to an internet protocol (IP) data type among data to be transmitted by the electronic device.

16 Claims, 7 Drawing Sheets

(58) Field of Classification Search
USPC .......................................................... 710/60
See application file for complete search history.

(56) References Cited

U.S. PATENT DOCUMENTS

| | | | | |
|---|---|---|---|---|
| 7,698,578 | B2* | 4/2010 | Williams | H03G 3/3042 |
| | | | | 713/323 |
| 9,591,121 | B2 | 3/2017 | Jung et al. | |
| 9,642,087 | B2 | 5/2017 | Tsai et al. | |
| 10,645,228 | B2 | 5/2020 | Kodali et al. | |
| 11,240,685 | B2* | 2/2022 | Lee | H04L 25/0222 |
| 2004/0235438 | A1* | 11/2004 | Quilisch | H04W 52/52 |
| | | | | 455/127.1 |
| 2009/0290625 | A1* | 11/2009 | Riddle | G06F 1/206 |
| | | | | 714/752 |
| 2010/0091691 | A1* | 4/2010 | Dorsey | H04W 52/0251 |
| | | | | 370/311 |
| 2011/0263212 | A1* | 10/2011 | Yeh | H04W 28/22 |
| | | | | 455/73 |
| 2011/0296064 | A1 | 12/2011 | Ehsan et al. | |
| 2011/0300805 | A1* | 12/2011 | Gaikwad | H04W 52/244 |
| | | | | 455/63.1 |
| 2013/0012258 | A1* | 1/2013 | Burgan | H04W 52/343 |
| | | | | 455/522 |
| 2014/0106827 | A1* | 4/2014 | Lim | H04W 52/0287 |
| | | | | 455/574 |
| 2014/0366041 | A1 | 12/2014 | Stanley-Marbell et al. | |
| 2015/0349836 | A1* | 12/2015 | Ponukumati | H04W 88/06 |
| | | | | 455/553.1 |
| 2018/0181171 | A1* | 6/2018 | Jang | G01K 7/427 |
| 2018/0262043 | A1* | 9/2018 | Yi | H02J 50/10 |
| 2019/0239098 | A1* | 8/2019 | Lee | H04W 24/02 |
| 2019/0268950 | A1* | 8/2019 | Youtz | H04W 76/30 |
| 2019/0364492 | A1 | 11/2019 | Azizi et al. | |
| 2020/0036643 | A1* | 1/2020 | Jang | H04W 28/0215 |
| 2020/0145053 | A1* | 5/2020 | Birk | H02J 13/00017 |
| 2020/0401373 | A1 | 12/2020 | Lesso | |
| 2021/0029643 | A1* | 1/2021 | Stauffer | H04W 76/27 |
| 2021/0058918 | A1* | 2/2021 | Zhou | H04B 17/102 |
| 2021/0160787 | A1* | 5/2021 | Zhou | H04W 8/24 |
| 2021/0195439 | A1* | 6/2021 | Prabhakar | H04W 76/19 |
| 2021/0318736 | A1 | 10/2021 | Ashwood et al. | |
| 2022/0006843 | A1 | 1/2022 | Do et al. | |
| 2022/0197355 | A1* | 6/2022 | Choi | G06F 1/206 |

FOREIGN PATENT DOCUMENTS

| | | |
|---|---|---|
| KR | 10-1410383 B1 | 6/2014 |
| KR | 10-2018-0078338 A | 7/2018 |
| KR | 10-2019-0084729 | 7/2019 |
| KR | 10-2019-0093204 A | 8/2019 |
| KR | 10-2021-0029487 A | 3/2021 |
| KR | 10-2318763 B1 | 10/2021 |
| KR | 10-2022-0003812 A | 1/2022 |

* cited by examiner

ELECTRONIC DEVICE AND METHOD FOR CONTROLLING HEAT GENERATION THEREOF DURING A CALL

CROSS-REFERENCE TO RELATED APPLICATION(S)

This application is a continuation application, claiming priority under § 365(c), of an International application No. PCT/KR2023/007618, filed on Jun. 2, 2023, which is based on and claims the benefit of a Korean patent application number 10-2022-0119877, filed on Sep. 22, 2022, in the Korean Intellectual Property Office, and of a Korean patent application number 10-2022-0125225, filed on Sep. 30, 2022, in the Korean Intellectual Property Office, the disclosure of each of which is incorporated by reference herein in its entirety.

TECHNICAL FIELD

The disclosure relates to an electronic device. More particularly, the disclosure relates to an electronic device and a method for controlling heat generation thereof.

BACKGROUND ART

Various electronic devices such as a smartphone, a tablet personal computer (PC), a portable multimedia player (PMP), a personal digital assistant (PDA), a laptop personal computer (laptop PC), and a wearable device are becoming widespread. Furthermore, recently, an electronic device (e.g., a foldable device) having a foldable characteristic including a flexible display having a bendable characteristic has been popularized.

As technology develops, various types of electronic devices are being developed, and performance required for these electronic devices is also increasing. As electronic devices operate to satisfy required performance, heat generation and power consumption are gradually increasing.

The above information is presented as background information only to assist with an understanding of the disclosure. No determination has been made, and no assertion is made, as to whether any of the above might be applicable as prior art with regard to the disclosure.

DISCLOSURE OF INVENTION

As communication technology develops, the complexity of the structure of an electronic device to provide high data throughput and/or low latency increases. As a result, current consumption of the electronic device may increase during data transmission/reception through an on-the-air (OTA) network or during a call according to call connection.

In addition, in an electronic device (e.g., a foldable device) having a bendable characteristic by having a flexible display having a bendable characteristic or an electronic device (e.g., a wearable device) having a structure that can be worn on a human body, heat dissipation may be difficult due to the structure of the device.

Aspects of the disclosure are to address at least the above-mentioned problems and/or disadvantages and to provide at least the advantages described below. Accordingly, an aspect of the disclosure is to solve the heat generation problem of an electronic device that provides reduced current consumption, high data transmission amount, and/or low transmission delay.

Additional aspects will be set forth in part in the description which follows and, in part, will be apparent from the description, or may be learned by practice of the presented embodiments.

In accordance with an aspect of the disclosure, an electronic device is provided. The electronic device includes a temperature sensor, a communication circuit, a memory, and a processor. The processor may identify whether the temperature measured through the temperature sensor satisfies a specified condition, in a state of performing data transmission or reception through a call channel between an external electronic device and the electronic device, adjust the bit rate of a codec that encodes data to be transmitted through the call channel when the measured temperature satisfies the specified condition, and block data transmission and/or reception through a radio bearer mapped to a packet data network (PDN) corresponding to an internet protocol (IP) data type among data to be transmitted by the electronic device.

In accordance with another aspect of the disclosure, a method for controlling heat generation of an electronic device is provided. The method includes identifying whether the temperature measured through the temperature sensor satisfies a specified condition, in a state of performing data transmission or reception through a call channel between an external electronic device and the electronic device, adjusting the bit rate of a codec that encodes data to be transmitted through the call channel when the measured temperature satisfies the specified condition, and blocking data transmission and/or reception through a radio bearer mapped to a packet data network (PDN) corresponding to an IP data type among data to be transmitted by the electronic device.

According to an embodiment, the electronic device may maintain a long available call time by adjusting data transmission or voice activity detection (VAD) operations that affect heat generation during a call.

According to an embodiment, the electronic device may prevent a situation in which a call is disconnected frequently during a call by controlling data transmission or a voice activity detection (VAD) operation that affects heat generation during a call.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
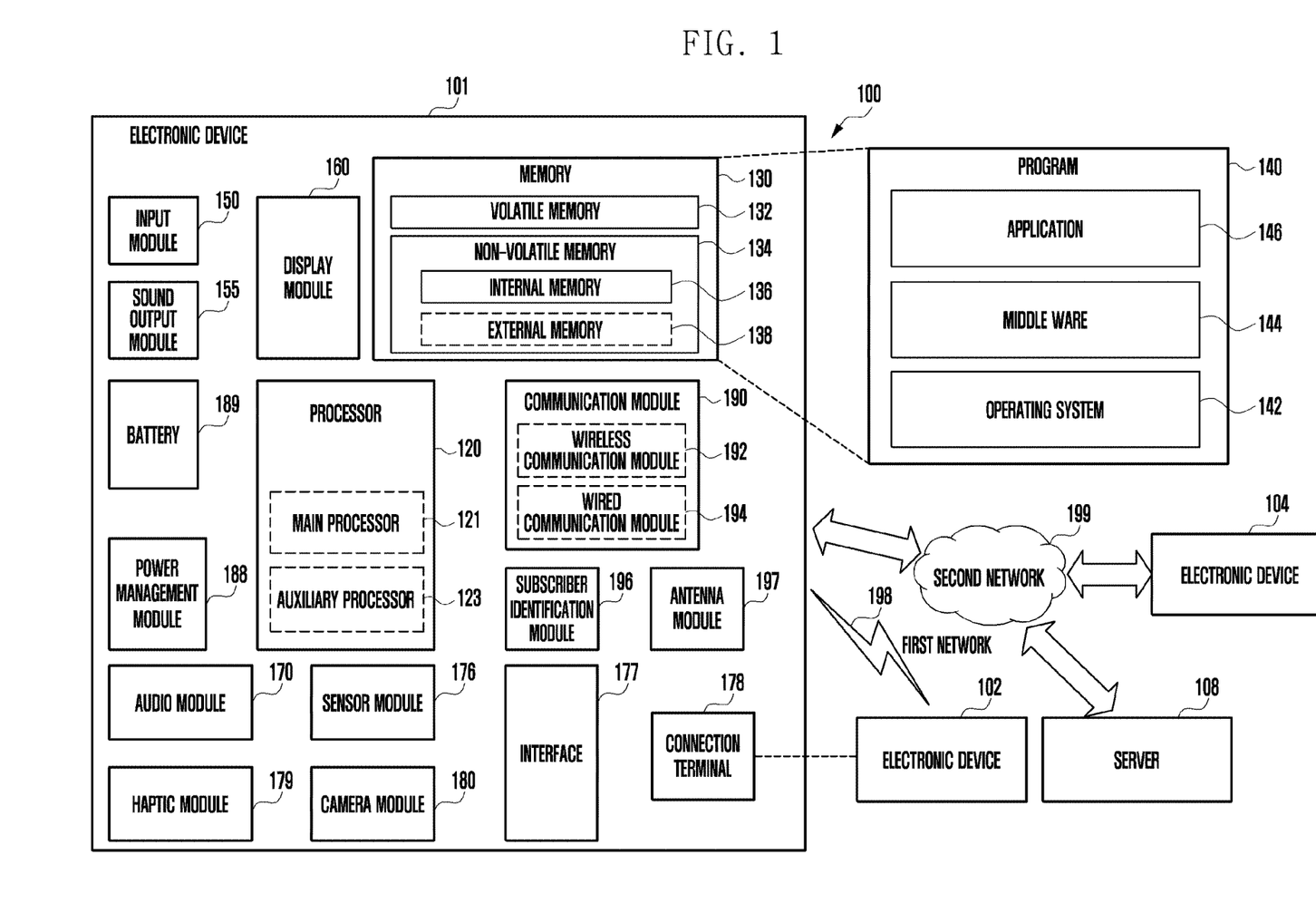
FIG. 1 is a block diagram of an electronic device in a network environment, according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with another element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
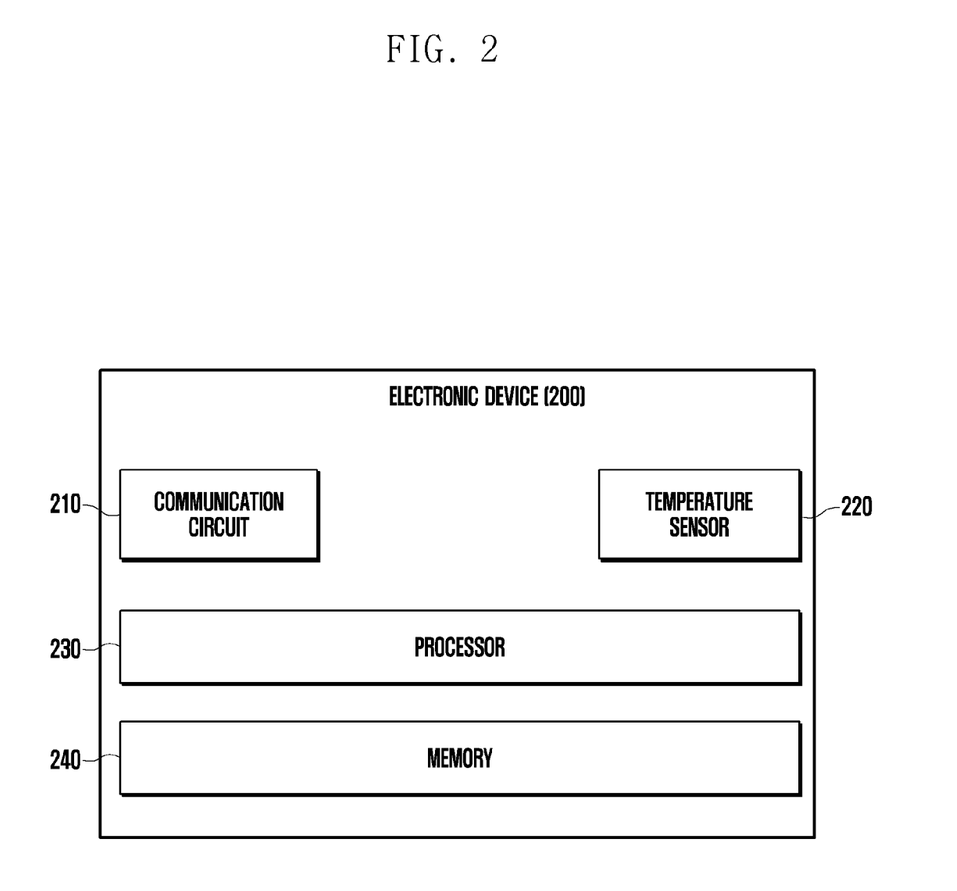
FIG. 2 is a block diagram illustrating a configuration of an electronic device according to an embodiment of the disclosure.

FIG. 2 is a block diagram illustrating a configuration of an electronic device according to an embodiment of the disclosure.

Referring to FIG. 2, the electronic device 200 may include a communication circuit 210, a temperature sensor 220, a processor 230, and a memory 240. Some of the illustrated components may be omitted or substituted. The electronic device may further include at least some of the configurations and/or functions of the electronic device 101 of FIG. 1. At least some of the components of the illustrated (or not illustrated) electronic device may be operatively, functionally, and/or electrically connected to each other.

According to an embodiment, the processor 230 may be a component capable of performing control of each component of the electronic device 200 and/or calculations or data processing related to communication, and include one or more processors. The processor 230 may include at least some of the components and/or functions of the processor 120 of FIG. 1.

According to another embodiment, the calculation and data processing functions that can be implemented by the processor 230 on the electronic device will not be limited, but hereinafter, features related to control of the temperature sensor 220 and the communication circuit 210 will be described in detail. Operations of the processor may be performed by loading instructions stored in the memory 240.

According to yet another embodiment, the electronic device 200 may include one or more memories 240, and the memory 240 may include a main memory and a storage. The main memory may include volatile memory such as dynamic random access memory (DRAM), static RAM (SRAM), or synchronous dynamic RAM (SDRAM). Alternatively, the memory 240 may include a large-capacity storage device as a non-volatile memory. The storage may include at least one of one time programmable ROM (OTPROM), programmable ROM (PROM), electrically programmable ROM (EPROM), electrically erasable programmable ROM (EEPROM), mask ROM, flash ROM, flash memory, a hard drive, or a solid state drive (SSD). The memory 240 may store various file data, and the stored file data may be updated according to the operation of the processor 230.

According to yet another embodiment, the temperature sensor 220 may measure the temperature of at least a part of the electronic device 200 (e.g., a component (e.g., a housing and/or parts) of the electronic device 200). The temperature information measured by the temperature sensor 220 may be transmitted to the processor 230.

The temperature measured by the temperature sensor 220 may include the temperature of a part of the electronic device 101 in which the temperature sensor 220 is disposed. The processor 230 may identify whether the temperature measured by the temperature sensor 220 satisfies a specified condition. The specified condition may include a condition in which the temperature measured by the temperature sensor 220 is higher than (or exceeds) a specified value (e.g., about 43 degrees).

According to yet another embodiment, the communication circuit 210 may communicate with an external electronic device through a wireless network under the control of the processor 230. The communication circuit 210 may include hardware and software modules for transmitting/receiving data from cellular networks (e.g., long term evolution (LTE) networks, 5G networks, new radio (NR) networks) and local networks (e.g., Wi-Fi, Bluetooth). The communication circuit 210 may include at least some of the components and/or functions of the communication module 190 of FIG. 1.

According to yet another embodiment, the processor 230 may identify whether the temperature measured by the temperature sensor satisfies a specified condition in a state of performing data transmission or reception through a call channel between the external electronic device and the electronic device 200. When the measured temperature satisfies the specified condition, the processor 230 may stop transmission of a specified type of data to be transmitted while the electronic device 200 transmits or receives data through the call channel. According to yet another embodiment, the data to be transmitted by the electronic device 200 may be transmitted or received through different packet data networks (PDNs) according to data types. The processor 230 may block transmission of specific data by blocking data transmission and/or reception through a radio bearer mapped to a packet data network (PDN) corresponding to specific types. For example, the processor 230 blocks transmission of data using the radio bearer mapped to the packet data network (PDN) corresponding to an IP data type. The processor 230 may block transmission of the data corresponding to the IP data type.

According to yet another embodiment, the specified type may include the IP data type.

According to yet another embodiment, the processor 230 may transmit a buffer status report (BSR) indicating the size of data other than the size of data of the specified type among data stored in the buffer of the processor 230 to a network. By transmitting the buffer status report including the size other than the size of the data of the specified type from the size of the data stored in the buffer, the electronic device 200 may be allocated a relatively small uplink resource from the network. The electronic device 200 can reduce heat generated by data transmission by being allocated the relatively small uplink resource. The operation of the processor 230 stopping transmission of the data of the specified type, based on the temperature condition of the electronic device 200, will be described with reference to FIG. 4A.

According to yet another embodiment, the processor 230 may control the communication circuit 210 to stop transmitting data through channels other than the call channel when the measured temperature satisfies the specified condition.

According to yet another embodiment, when the measured temperature satisfies the specified condition, the processor 230 may adjust a bit rate of a codec that encodes data to be transmitted through the call channel. For example, when the temperature of the electronic device 200 exceeds a specified value (e.g., about 43 degrees), the processor 230 reduces the bit rate of the codec that encodes data to be transmitted through the call channel. In an embodiment, when the temperature of the electronic device 200 is less than (or less than) the specified value (e.g., about 41 degrees), the processor 230 may again increase the bit rate of the codec that encodes data to be transmitted over the call channel.

According to yet another embodiment, when the measured temperature exceeds a certain level, the processor 230 may reduce the bit rate of the codec that encodes the data to be transmitted through the call channel. As the bit rate of the codec decreases, the size of the data to be transmitted may decrease. Accordingly, the electronic device 200 may reduce power consumption and heat generation by transmitting relatively small-sized data through the call channel.

According to yet another embodiment, when the measured temperature satisfies the specified condition, the processor 230 may adjust an energy level that is configured as a reference value in determining whether the received sound includes the user's voice in the voice activity detection (VAD) operation of classifying a section including the user's voice. The processor 230 may identify the energy level of the received sound, and determine that the received sound includes the user's voice, based on whether the identified energy level is equal to or greater than (or exceeds) a specified value. The processor 230 may process a portion of sound including the user's voice and transmit the processed data through the call channel. The electronic device 200 may adjust an energy level that determines whether a portion of the sound includes voice. According to an example, the processor 230 increases an energy level that is configured as a reference value in determining whether the electronic device 200 includes the user's voice, based on the temperature of the electronic device 200 exceeding a first level. An increase in the energy level may lower the probability that a portion of the sound is determined to be the user's voice, and may reduce the size of data to be transmitted. The voice activity detection (VAD) operation may refer to an operation of separating a section in which voice frames are output due to the user's voice activity and a section in which output of the audio frames is stopped and only background noise information is periodically output when there is no user's voice activity. The processor 230 may determine the user's voice activity and background noise, based on the energy level that is a reference for determining whether or not the user's voice. The operation of adjusting the energy level, which is a reference for determining whether or not the user's voice, will be described with reference to FIG. 3.

According to an embodiment, when the measured temperature satisfies the specified condition, the processor 230 may adjust the period of the voice activity detection (VAD) operation.

According to yet another embodiment, when the measured temperature exceeds a certain level, the processor 230 may increase the period of the voice activity detection (VAD) operation. For example, the processor 230 increases the voice activity detection period, based on the temperature of the electronic device 200 exceeding the first level. The processor 230 may reduce the number of voice activity detection operations by increasing the voice activity detection period, and reduce heat generation of the electronic device 200 by reducing power consumption. The operation of the processor 230 adjusting the period of the voice activity detection (VAD) operation or an energy level that is a reference for determining whether or not the user's voice will be described with reference to FIG. 4B.

According to yet another embodiment, the processor 230 may identify whether the temperature measured through the temperature sensor satisfies the specified condition in a connection process between the external electronic device and the electronic device 200 through the call channel, and may determine a codec supporting the lowest bit rate among one or more codecs (or a codec supporting a bit rate less than a certain value) as a codec to encode the data to be transmitted through a call channel when the measured temperature satisfies a specified condition or the output strength of a signal to be transmitted through the communication circuit satisfies a specified condition.

According yet another an embodiment, the processor 230 may detect a record of a forced call drop due to an increase in the internal temperature of the electronic device 200 in the memory, measure the transmission power of the electronic device 200, based on not detecting the forced call drop record, and control to determine a codec supporting the lowest bit rate among one or more codecs as a codec to encode data to be transmitted through a call channel, based on the transmission power of the electronic device 200 exceeding a preconfigured level. The operation of determining the codec to perform encoding of data to be transmitted through a call channel will be described with reference to FIG. 5.

Figure 3:
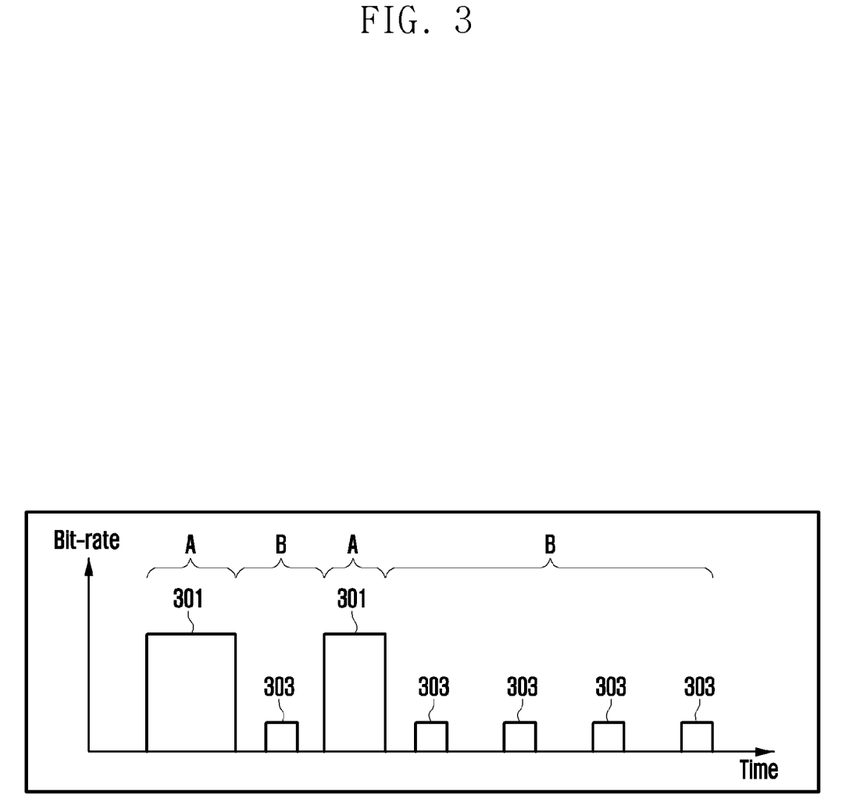
FIG. 3 illustrates an output bit-rate of a voice codec to which a discontinuous transmission (DTX) technique is applied according to an embodiment of the disclosure.

FIG. 3 illustrates the output bit-rate of a voice codec to which the DTX technique is applied according to an embodiment of the disclosure.

For example, in an adaptive multi-rate narrow band (AMR-NB) codec operating at the bit-rate of 7.4 kbps, when a voice signal is input, voice frames 301 compressed at 7.4 kbps are outputted. On the other hand, when a voice signal is not input, transmission of voice frames may be stopped, and only background noise information may be loaded into a silence descriptor frame (SID) 303 to be periodically transmitted at a bit-rate lower than a bit rate at which the voice frames are transmitted.

Referring to FIG. 3, section A represents a section in which audio frames are output due to user's voice activity, and section B indicates a section in which output of audio frames is stopped and only background noise information is periodically output when there is no user's voice activity. As shown in FIG. 3, according to discontinuous transmission (DTX), a bit-rate consumed to transmit information to a counterpart terminal device and power consumed by the terminal device can be saved. The DTX may mean a method of distinguishing between user's voice and background noise information during a call and stopping the output of voice frames in a part of the section where the user's voice is not included.

In an embodiment, a processor (e.g., the processor 230 of FIG. 2) may adjust the voice activity detection (VAD) period, based on the temperature of an electronic device (e.g., the electronic device 200 of FIG. 2) exceeding (or exceeding) a certain level. For example, the processor 230 increases the voice activity detection period, based on the temperature of the electronic device 200 exceeding a first level. The processor 230 may reduce the number of voice activity detection operations by increasing the voice activity detection period and reducing heat generation of the electronic device 200 by reducing power consumption.

In another embodiment, the processor 230 may adjust an energy level that is a reference for determining whether or not the user's voice, based on whether the temperature of the electronic device 200 exceeds (or is higher than) a certain level. For example, the processor 230 increases the energy level determined as the user's voice, based on the temperature of the electronic device 200 exceeding the first level. The processor 230 may increase the energy level determined to be the user's voice to decrease a section A 301 determined to be the user's voice and increase a section B 303 in which only background noise information is periodically output. The processor 230 may decrease the section A 301 determined to be the user's voice to reduce power consumed in transmitting voice data upon call connection and reduce heat generation of the electronic device 200.

Figure 4A:
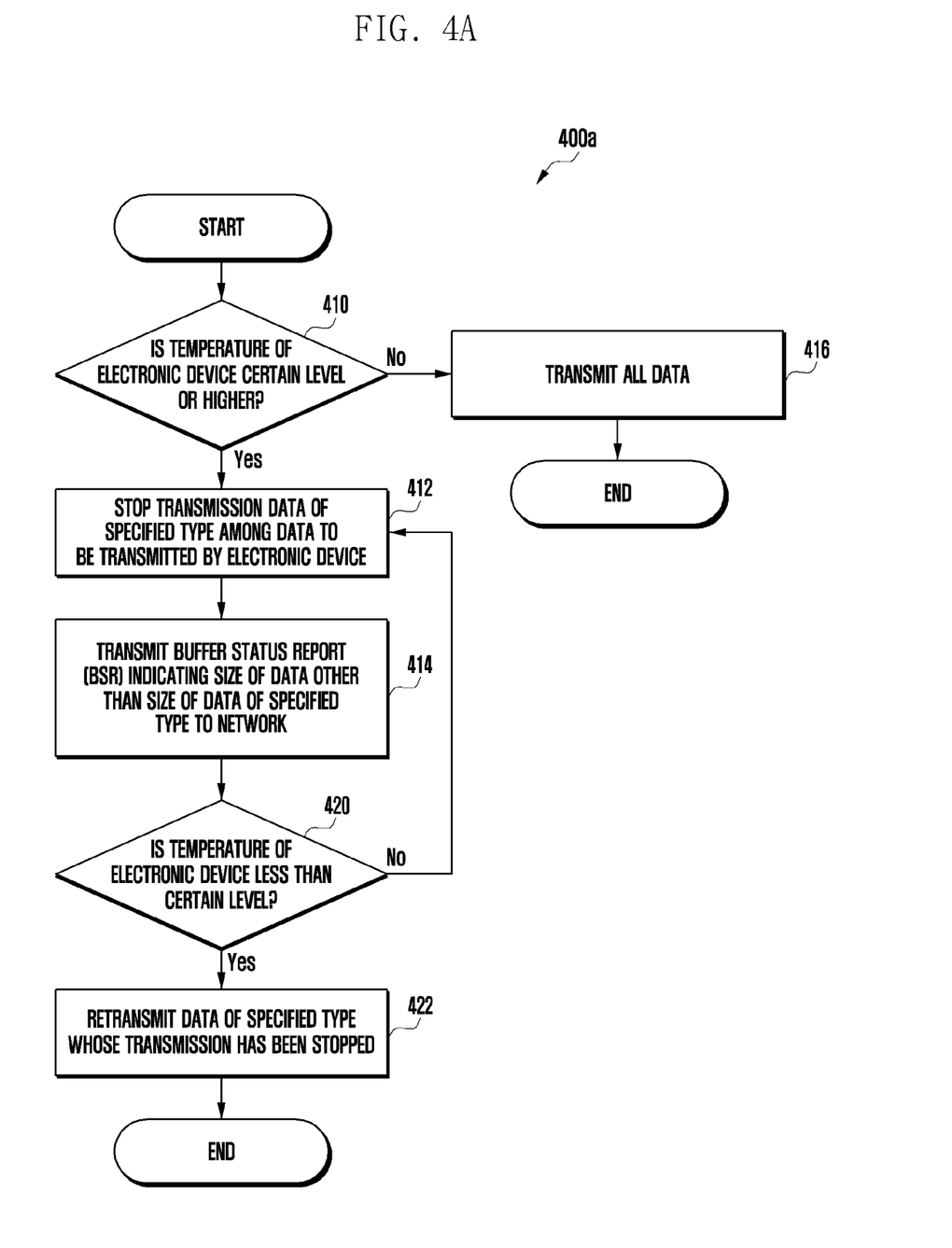
FIGS. 4A and 4B are flowcharts illustrating a method for controlling heat generation of an electronic device in a call connection state according to various embodiments of the disclosure.
Figure 4B:
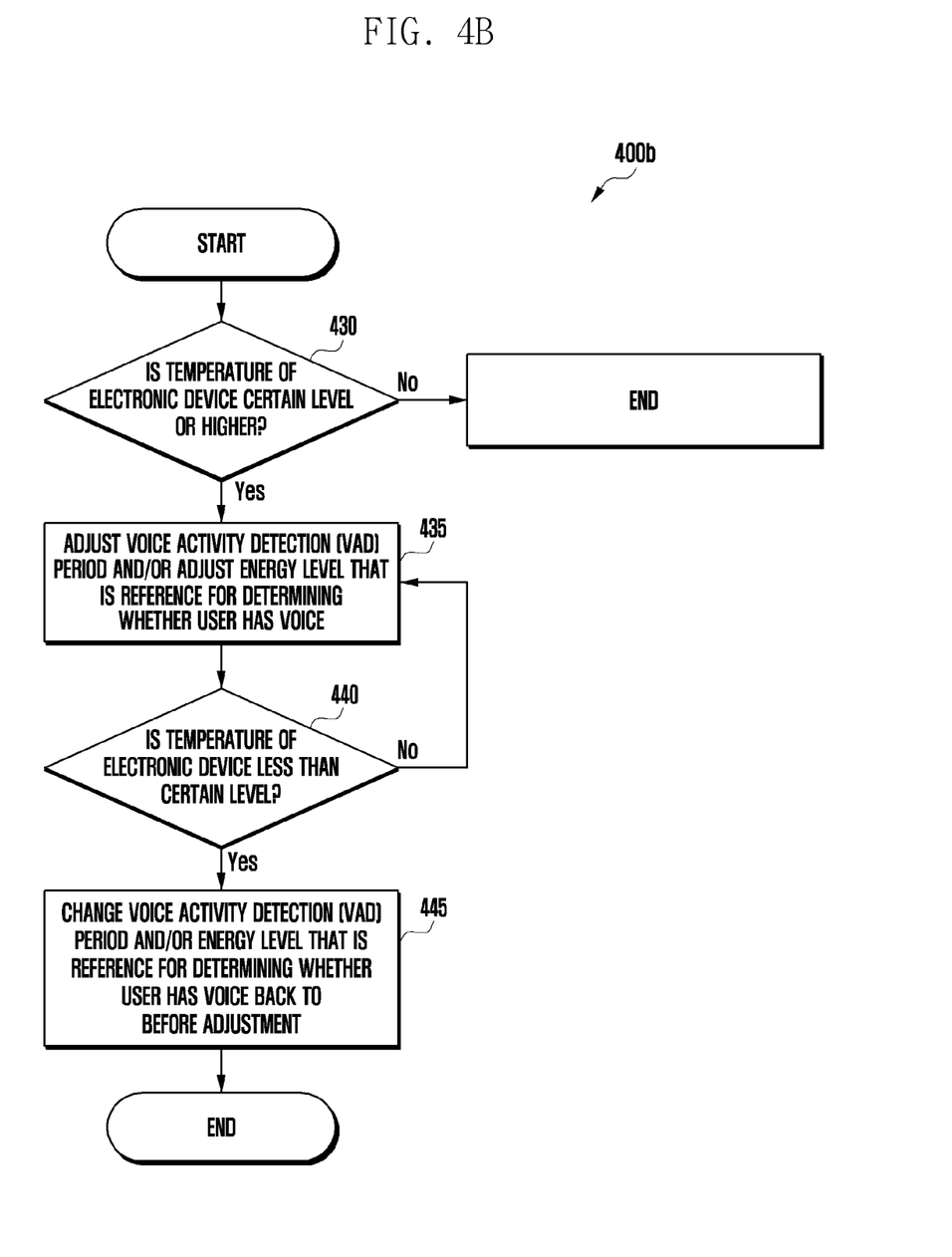

FIGS. 4A and 4B are flowcharts illustrating a method for controlling heat generation of an electronic device in a call connection state according to various embodiments of the disclosure.

The operations illustrated through FIGS. 4A and 4B may be implemented based on instructions that may be stored in a computer recording medium or memory (e.g., the memory 130 of FIG. 1).

Referring to FIGS. 4A and 4B, the illustrated methods 400a and 400b may be executed by an electronic device (e.g., the electronic device 200 of FIG. 2) previously described with reference to FIGS. 1 to 3, and the technical features described above are omitted below. The order of each operation in FIGS. 4A and 4B may be changed, some operations may be omitted, and some operations may be performed simultaneously.

In operation 410, a processor (e.g., the processor 230 of FIG. 2) may identify whether the temperature of the electronic device 200 is equal to or higher than (or exceeds) a certain level. When the temperature of the electronic device 200 is lower than the certain level, the processor 230 may control a communication circuit (e.g., the communication circuit 210 of FIG. 2) to transmit all data in a call connection state (416). All data may include IP data unrelated to call connection, in addition to call data transmitted to an external electronic device with which call connection is made. For example, the electronic device 200 may transmit or receive IP data with a server of an application being executed. The application being executed may include various applications (e.g., Internet, map, or SNS application) in addition to the phone application.

In operation 412, the processor 230 may stop transmission of a specified type of data to be transmitted by the electronic device 200, based on the temperature of the electronic device 200 equal to or higher than a certain level.

The processor 230 may block transmission of specific data by blocking transmission and/or reception of data through a radio bearer mapped to a packet data network (PDN) corresponding to the specific type. For example, the processor 230 blocks transmission of data corresponding to the specified type by blocking the transmission and/or reception of data through the radio bearer mapped to a packet data network (PDN) corresponding to an IP data type.

In an embodiment, the specified type may include the IP data type. The processor 230 may reduce the output time of the electronic device 200 by stopping transmission of the data of the specified type. The processor 230 may suppress heat generation of the electronic device 200 and lower the temperature of the electronic device 200 by stopping transmission of the data of the specified type. According to the disclosure, the processor 230 may lower the temperature of the electronic device 200 to provide a stable service to the user so that the call connection is not disconnected.

In operation 414, the processor 230 may transmit a buffer status report (BSR) indicating the size of data other than the size of data of the specified type to a network.

The electronic device 200 may be allocated relatively small uplink resources from the network by transmitting the buffer status report including a value excluding the size of data of the specified type from the size of data stored in the buffer. The electronic device 200 can reduce heat generated by data transmission by being allocated the relatively small uplink resources.

In operation 420, the processor 230 may identify whether the temperature of the electronic device 200 is less than a certain level. Based on the fact that the temperature of the electronic device 200 is not lower than the certain level, in operation 412, the processor 230 may maintain the state in which transmission of the data of the specified type among data to be transmitted by the electronic device 200 is stopped. Based on the fact that the temperature of the electronic device 200 is less than the certain level, in operation 422, the processor 230 may control the communication circuit 210 to retransmit the data of the specified type, whose transmission has been stopped. The processor 230 may identify that the temperature of the electronic device 200 is less than the certain level and determine that the electronic device 200 is not in an overheated state. The processor 230 may retransmit the data of the specified type in addition to communication data (e.g., voice data), based on the fact that the electronic device 200 is not in an overheated state.

In operation 430 of FIG. 4B, the processor (e.g., the processor 230 of FIG. 2) may identify whether the temperature of the electronic device 200 is equal to or higher than the certain level (or exceeds). When the temperature of the electronic device 200 is less than the certain level, the processor 230 may terminate the heating control method of the electronic device 200 while maintaining the voice activity detection (VAD) period and an energy level that is a reference for determining whether or not the user's voice. The processor 230 may adjust the voice activity detection (VAD) period in operation 435, based on whether the temperature of the electronic device 200 is equal to or higher than the certain level. For example, the processor 230 increases the voice activity detection period, based on the temperature of the electronic device 200 exceeding the first level. The processor 230 may reduce the number of voice activity detection operations by increasing the voice activity detection period and reduce heat generation of the electronic device 200 by reducing power consumption.

Alternatively, in operation 435, the processor 230 may adjust the energy level that is configured as a reference value in determining whether to include the user's voice, based on the fact that the temperature of the electronic device 200 exceeds (or exceeds) the certain level. For example, the processor 230 increases the energy level that is configured as the reference value in determining whether to include the user's voice, based on the fact that the temperature of the electronic device 200 exceeds the first level. The processor 230 may increase the energy level to decrease section A (e.g., section A 301 in FIG. 3) determined to be the user's voice, and increase period B (e.g., period B 303 of FIG. 3) in which only background noise information is periodically output. The processor 230 may decrease the section A 301 determined to be the user's voice to reduce power consumed in transmitting voice data upon call connection and reduce heat generation of the electronic device 200.

In operation 440, the processor 230 may identify whether the temperature of the electronic device 200 is less than the certain level. Based on the fact that the temperature of the electronic device 200 is not less than the certain level in operation 435, the processor 230 may adjust the voice activity detection (VAD) period and/or an energy level that is a reference for determining whether or not the user's voice.

In operation 445, the processor 230 may change the voice activity detection period adjusted based on the temperature of the electronic device 200 below the certain level and/or the energy level used as the reference for determining whether or not the user's voice, back to the level of the method 400b. The processor 230 may identify that the temperature of the electronic device 200 is less than the certain level and determine that the electronic device 200 is not in an overheated state. The processor 230 may improve voice quality by changing the adjusted voice activity detection period and/or the energy level, which is a reference for determining whether or not the user's voice, back to the level at the start of method 400b.

Figure 5:
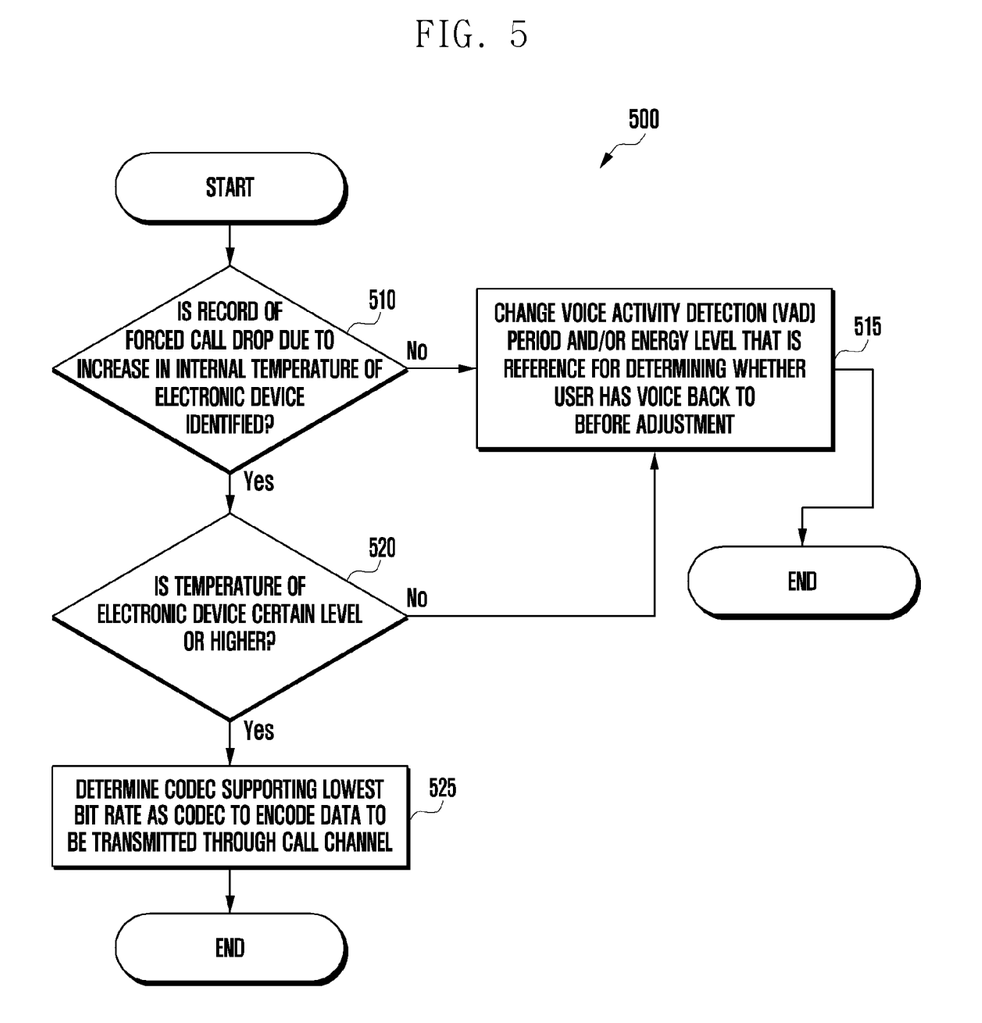
FIG. 5 is a flowchart illustrating a method for controlling heat generation of an electronic device in a state before call connection according to an embodiment of the disclosure.

FIG. 5 is a flowchart illustrating a method for controlling heat generation of an electronic device in a state before call connection according to an embodiment of the disclosure.

The operations described with reference to FIG. 5 may be implemented based on instructions that may be stored in a computer recording medium or memory (e.g., the memory 240 of FIG. 2).

Referring to FIG. 5A, the illustrated method 500 may be executed by an electronic device (e.g., the electronic device 200 of FIG. 2) previously described with reference to FIGS. 1 to 3, and technical features described above will be omitted below. The order of each operation in FIG. 5 may be changed, some operations may be omitted, or some operations may be performed simultaneously.

In operation 510, a processor (e.g., the processor 230 of FIG. 2) may identify a record of a forced call drop due to an increase in the internal temperature of the electronic device 200 on a memory (e.g., the memory 240 of FIG. 2).

For example, the processor 230 detects an increase in the internal temperature of the electronic device 200 and forcibly execute a call drop during a call of the user. Such call drop may provide a poor user experience in which the call is dropped during a call. When a call drop recording is detected, the electronic device 200 according to the disclosure may change the type of codec that encodes data to be transmitted through the call channel, based on the state of the electronic device 200 before the call connection, under the control of the processor 230.

In operation 515, the processor 230 may maintain the type of codec that encodes the data to be transmitted through the call channel, based on the fact that the record of forced call drop due to the increase of the internal temperature of the electronic device 200 is not identified.

In operation 520, the processor 230 may identify whether the temperature of the electronic device 200 is equal to or higher than (or exceeds) a certain level, based on the fact that the record of forced call drop due to the increase of internal temperature of the electronic device 200 is identified. Alternatively, the processor 230 may identify whether the output (Tx power) of the electronic device 200 is equal to or higher than a certain level (or exceeds).

In operation 515, the processor 230 may maintain the type of codec that encodes data to be transmitted through the call channel, based on the fact that the temperature of the electronic device 200 is less than the certain level and the output (Tx power) of the electronic device 200 is less than the certain level.

In operation 525, the processor 230 may determine a codec supporting the lowest bit rate as a codec to encode data to be transmitted through a call channel, based on the fact that the temperature of the electronic device 200 is equal to or higher than (or exceeds) the certain level or the output (Tx power) of the electronic device 200 is equal to or higher than (or exceeds) the certain level. For example, the processor 230 determines an adaptive multi-rate narrow band (AMR-NB) codec as the codec to encode data to be transmitted through a call channel in a VoLTE environment. This is just an example, and the processor 230 differently determines the type of codec to encode the data to be transmitted through the call channel according to the operation environment of the electronic device 200.

Figure 6:
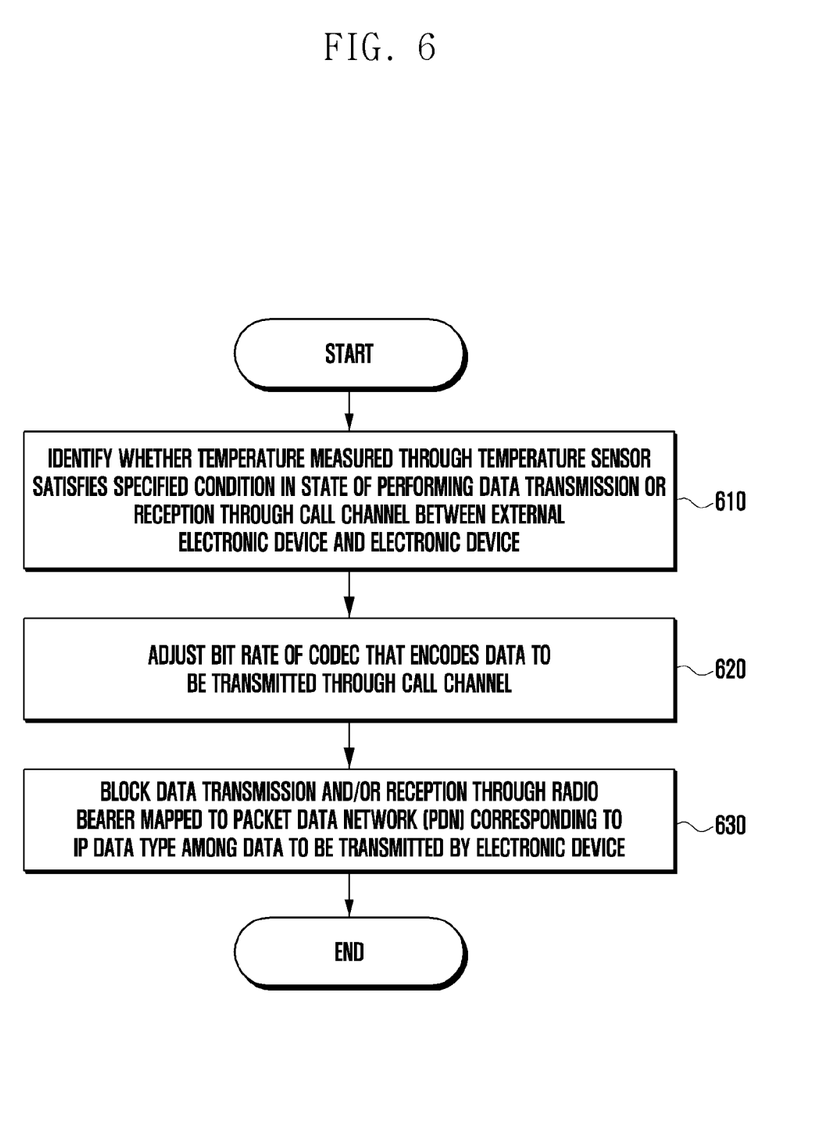
FIG. 6 is a flowchart illustrating a method for controlling heat generation of an electronic device according to an embodiment of the disclosure.

FIG. 6 is a flowchart illustrating a method for controlling heat generation of an electronic device according to an embodiment of the disclosure.

The operations described with reference to FIG. 6 may be implemented based on instructions that may be stored in a computer recording medium or memory (e.g., the memory 240 of FIG. 2).

The illustrated methods may be executed by an electronic device (e.g., the electronic device 200 of FIG. 2) previously described with reference to FIGS. 1 to 3, and technical features described above will be omitted below. The order of each operation in FIG. 6 may be changed, some operations may be omitted, or some operations may be performed simultaneously.

Referring to FIG. 6, in operation 610, a processor (e.g., the processor 230 of FIG. 2) may identify whether a temperature measured through a temperature sensor (e.g., the temperature sensor 220 of FIG. 2) satisfies a specified condition in a state of performing data transmission or reception through a call channel between an external electronic device and the electronic device 200. The specified condition may include a condition in which the temperature measured by the temperature sensor 220 is equal to or higher than (or exceeds) a specified value (e.g., about 43 degrees).

In operation 620, when the measured temperature satisfies the specified condition, the processor 230 may adjust a bit rate of a codec that encodes data to be transmitted through a call channel. For example, when the temperature of the electronic device 200 exceeds the specified value (e.g., about 43 degrees), the processor 230 reduces the bit rate of the codec that encodes data to be transmitted through a call channel. In an embodiment, when the temperature of the electronic device 200 is less than (or less than) a specified value (e.g., about 41 degrees), the processor 230 may again increase the bit rate of the codec that encodes data to be transmitted through the call channel.

According to another embodiment, the processor 230 may reduce the bit rate of the codec that encodes the data to be transmitted through the call channel when the measured temperature exceeds the certain level. As the bit rate of the codec decreases, the size of the data to be transmitted may decrease. Accordingly, the electronic device 200 may reduce power consumption and heat generation by transmitting relatively small-sized data through the call channel.

In operation 630, the processor 230 may block some of the data to be transmitted by the electronic device. The processor 230 may block data transmission and/or reception through a radio bearer mapped to a packet data network (PDN) corresponding to an IP data type. According to yet another embodiment, the data to be transmitted by the electronic device 200 may be transmitted or received through different packet data networks (PDNs) according to data types. The processor 230 may block transmission of specific data by blocking data transmission and/or reception through the radio bearer mapped to the packet data network (PDN) corresponding to a specific type. For example, the processor 230 blocks transmission of data using the radio bearer mapped to the packet data network (PDN) corresponding to the IP data type. The processor 230 may block transmission of data the corresponding to the IP data type.

According to yet another embodiment, when the measured temperature satisfies the specified condition, the processor 230 may adjust an energy level that is configured as a reference value in determining whether the received sound includes the user's voice in a voice activity detection (VAD) operation of classifying a section including the user's voice. The processor 230 may identify the energy level of the received sound, and determine that the received sound includes the user's voice, based on whether the identified energy level is equal to or higher than (or exceeds) a specified value. The voice activity detection (VAD) operation may refer to an operation of separating a section in which voice frames are output due to the user's voice activity and a section in which output of the audio frames is stopped and only background noise information is periodically output when there is no user's voice activity. The processor 230 may determine the user's voice activity and background noise, based on an energy level that is a reference for determining whether the user's voice is present.

An electronic device may include a temperature sensor, a communication circuit, a memory, and a processor. The processor may identify whether the temperature measured through the temperature sensor satisfies a specified condition, in a state of performing data transmission or reception through a call channel between an external electronic device and the electronic device, adjust the bit rate of a codec that encodes data to be transmitted through the call channel when the measured temperature satisfies the specified condition, and block data transmission and/or reception through a radio bearer mapped to a packet data network (PDN) corresponding to an IP data type among data to be transmitted by the electronic device.

In an embodiment, the processor may transmit a buffer status report (BSR) indicating the size of data other than the size of the specified type of data among the data stored in the buffer of the processor to a network.

In another embodiment, the specified condition may include a condition in which the measured temperature is equal to or greater than a specified value.

In yet another embodiment, the processor may control the communication circuit to stop transmission of data through a channel other than the call channel when the measured temperature satisfies the specified condition.

In yet another embodiment, the processor may reduce the bit rate when the measured temperature exceeds a certain level.

In yet another embodiment, the processor may increase the bit rate when the measured temperature is less than the certain level.

In yet another embodiment, the processor may adjust an energy level that is a reference for determining whether the user's voice is heard in a voice activity detection (VAD) operation for classifying a section including the user's voice when the measured temperature satisfies the specified condition.

In yet another embodiment, the processor may adjust the period of the voice activity detection (VAD) operation when the measured temperature satisfies the specified condition.

In yet another embodiment, the processor may increase the period of the voice activity detection (VAD) operation when the measured temperature exceeds the specified level.

A method for controlling heat generation of an electronic device may include identifying whether the temperature measured through the temperature sensor satisfies a specified condition, in a state of performing data transmission or reception through a call channel between an external electronic device and the electronic device; adjusting the bit rate of a codec that encodes data to be transmitted through the call channel when the measured temperature satisfies the specified condition; and blocking data transmission and/or reception through a radio bearer mapped to a packet data network (PDN) corresponding to an IP data type among data to be transmitted by the electronic device.

In an embodiment, the configuring the electronic device to stop transmission of data of a specified type among data to be transmitted and transmit or receive the data through the call channel may further include transmitting a buffer status report (BSR) indicating a size of data other than a size of a specified type of data stored in the buffer of the processor to a network.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a temperature sensor configured to measure temperature of at least a part of the electronic device;
   a communication circuit;
   at least one processor; and
   memory storing instructions,
   wherein the instructions, when executed by the at least one processor individually or collectively, cause the electronic device to:
   identify whether the temperature measured through the temperature sensor is equal to or higher than a first temperature, while performing a call data transmission or reception through a call channel between an external electronic device and the electronic device, and if the temperature is equal to or higher than the first temperature:
reduce a bit rate of a codec that encodes a call data to be transmitted through the call channel, and
increase a reference energy level for a voice activity detection (VAD) operation that determines a user's voice.

2. The electronic device of claim 1, wherein the instructions, when executed by the at least one processor individually or collectively, cause the electronic device to stop transmission of non-call related data through a radio bearer mapped to a packet data network (PDN), based on identifying that the measured temperature is equal to or higher than the first temperature, while the electronic device transmits or receives data through the call channel.

3. The electronic device of claim 1,
wherein the VAD operation is an operation of separating a section in which voice frames are output due to a user's voice activity and a section in which output of audio frames is stopped and only background noise information is periodically output when there is no user's voice activity, and
wherein the increasing of the reference energy level causes an increase in a number of transmitted silence descriptor (SID) frames having a lower bit rate than voice frames.

4. The electronic device of claim 1, wherein the at least one processor is further configured to adjust an energy level that is a reference for determining whether or not a user's voice in a voice activity detection (VAD) operation for classifying a section including the user's voice in case that the measured temperature satisfies a specified condition.

5. The electronic device of claim 1, wherein the instructions, when executed by the at least one processor individually or collectively, cause the electronic device to adjust a period of a voice activity detection (VAD) operation based on identifying that the measured temperature is equal to or higher than the first temperature.

6. The electronic device of claim 5, wherein the instructions, when executed by the at least one processor individually or collectively, cause the electronic device to increase the period of the VAD operation.

7. A method for controlling heat generation of an electronic device, the method comprising:
identifying whether a temperature measured through a temperature sensor is equal to or higher than a first temperature while performing call data transmission or reception through a call channel between an external electronic device and the electronic device; and
if the temperature is equal to or higher than the first temperature:
reducing, by at least one processor of the electronic device, a bit rate of a codec that encodes the call data to be transmitted through the call channel, and
increasing a reference energy level for a voice activity detection (VAD) operation that determines a user's voice.

8. The method of claim 7,
wherein the VAD operation is an operation of separating a section in which voice frames are output due to a user's voice activity and a section in which output of audio frames is stopped and only background noise information is periodically output when there is no user's voice activity, and
wherein the increasing of the reference energy level causes an increase in a number of transmitted silence descriptor (SID) frames having a lower bit rate than voice frames.

9. The method of claim 7, further comprising controlling a communication circuit of the electronic device, based on identifying that the measured temperature is equal to or higher than the first temperature, to stop data transmission through at least one radio bearer mapped to a packet data network (PDN) for transmitting non-call related data.

10. The method of claim 7, further comprising:
adjusting an energy level that is a reference for determining whether or not a user's voice in a voice activity detection (VAD) operation that distinguishes a section including the user's voice based on identifying that the measured temperature is equal to or higher than the first temperature.

11. The method of claim 7, further comprising:
adjusting a period of a voice activity detection (VAD) operation based on identifying that the measured temperature is equal to or higher than the first temperature.

12. The method of claim 11, further comprising increasing the period of the VAD operation based on identifying that the measured temperature is equal to or higher than the first temperature.

13. The method of claim 11, wherein the adjusting of the period of the VAD operation comprises reducing a number of voice activity detection operations by increasing the voice activity detection period and reducing heat generation of the electronic device by reducing power consumption.

14. The method of claim 11, wherein, when the measured temperature of the electronic device is less than a second temperature, the method further comprises controlling a communication circuit to transmit call data through the call channel at an increased bit rate.

15. The electronic device of claim 1, wherein the instructions, when executed by the at least one processor individually or collectively, further cause the electronic device to:
increase the reduced bit rate of a codec that encodes a call data to be transmitted through the call channel based on identifying that the temperature is less than a second temperature, and
decrease the increased reference energy level for the VAD operation based on identifying that the temperature is less than a second temperature.

16. The method of claim 7, further comprising:
increasing the reduced bit rate of the codec based on identifying that the temperature is less than a second temperature; and decreasing the increased reference energy level for the VAD operation based on identifying that the temperature is less than a second temperature.

* * * * *